US012097617B2

(12) United States Patent
Faust

(10) Patent No.: US 12,097,617 B2
(45) Date of Patent: Sep. 24, 2024

(54) CONTROLLING CONTACT FORCE IN A MACHINE TOOL

(71) Applicant: ATI Industrial Automation, Inc., Apex, NC (US)

(72) Inventor: Derek Faust, Durham, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 795 days.

(21) Appl. No.: 16/804,870

(22) Filed: Feb. 28, 2020

(65) Prior Publication Data

US 2021/0268649 A1  Sep. 2, 2021

(51) Int. Cl.
*B25J 9/16* (2006.01)
*B25J 11/00* (2006.01)

(52) U.S. Cl.
CPC .......... *B25J 9/1633* (2013.01); *B25J 11/005* (2013.01)

(58) Field of Classification Search
CPC .... B25J 9/1633; B25J 11/005; B25J 11/0065; B25J 13/085; B24B 19/00; B24B 41/00; B24B 41/007; B24B 49/165; B24B 51/00
See application file for complete search history.

(56) References Cited

U.S. PATENT DOCUMENTS

| 5,448,146 | A | 9/1995 | Erlbacher |
| 9,110,456 | B2 | 8/2015 | Zhang et al. |
| 9,375,840 | B2 | 6/2016 | Naderer et al. |
| 9,855,636 | B2 | 1/2018 | Naderer |
| 9,889,561 | B2 | 2/2018 | Sato |
| 10,150,200 | B2 | 12/2018 | Ueda |
| 10,493,617 | B1* | 12/2019 | Holson .................. B25J 13/088 |
| 10,702,351 | B2* | 7/2020 | Tojo .......................... G06T 7/62 |
| 10,906,177 | B2 | 2/2021 | Naderer et al. |
| 2007/0089304 | A1* | 4/2007 | Loomis .................. B28D 1/225 33/549 |
| 2008/0140257 | A1* | 6/2008 | Sato ....................... B25J 9/1633 901/30 |
| 2011/0108265 | A1* | 5/2011 | Ge ........................ E21B 19/165 166/85.1 |

(Continued)

FOREIGN PATENT DOCUMENTS

| CN | 105643399 A | 6/2016 |
| CN | 106239476 A | 12/2016 |

(Continued)

*Primary Examiner* — Harry Y Oh

(74) *Attorney, Agent, or Firm* — COATS & BENNETT, PLLC

(57) ABSTRACT

Techniques are provided for controlling the contact force in a single-axis, force-controlled tool responsive to dynamic process variables such as tool orientation relative to the workpiece, curvature of the workpiece wear of the abrasive media and other dynamic process variables that are not otherwise controlled by a single-axis, force-controlled actuator. A control system includes sensors for determining a contact force between the tool and the workpiece along a single-axis of compliance, and one or more additional process parameters, such as an overturning moment on the tool due to the orientation of the workpiece and surface curvature, torque about an axis of rotation of the tool, etc. The control circuit uses the measurement of these additional parameters are used to determine the control force between the tool and the workpiece.

37 Claims, 11 Drawing Sheets

(56) References Cited

U.S. PATENT DOCUMENTS

| | | | |
|---|---|---|---|
| 2016/0354933 A1 | 12/2016 | Sato | |
| 2017/0027652 A1* | 2/2017 | Johnson | A61B 90/50 |
| 2017/0128136 A1* | 5/2017 | Post | A61B 34/10 |
| 2018/0326591 A1* | 11/2018 | Häusler | G01B 11/24 |
| 2020/0405405 A1* | 12/2020 | Shelton, IV | G16H 40/67 |
| 2021/0078135 A1 | 3/2021 | Naderer | |

FOREIGN PATENT DOCUMENTS

| | | |
|---|---|---|
| CN | 110103115 A | 8/2019 |
| CN | 110328577 A | 10/2019 |
| DE | 102011006679 A1 | 9/2012 |
| DE | 102014119532 A1 | 6/2016 |
| DE | 102015104164 A1 | 9/2016 |
| DE | 102016006704 B4 | 12/2016 |
| DE | 102017110773 A1 | 11/2017 |
| DE | 102018106086 A1 | 9/2019 |

\* cited by examiner

CONTROLLING CONTACT FORCE IN A MACHINE TOOL

TECHNICAL FIELD

The present disclosure relates generally to material removal and surface finishing processes and more particularly, to force control of automated surface finishing and material removal tools.

BACKGROUND

Many manufactured parts require surface finishing such as grinding, sanding and polishing to provide a smooth surface. These contact tasks are labor intensive but can be automated with machine tooling. Numerous manufacturers provide machine tools that can be mounted on a robotic arm or manipulator to grind, sand, or polish the surface of a manufactured part. Typically, the machine tool is mounted to the manipulator by an actuator that moves the machine tool along a single axis and some form of feedback control is used to maintain the contact force between the workpiece and the tool constant.

The results produced by the machine tool can vary depending on the contact pressure applied, which can vary dynamically even when the contact force remains constant. For example, the area of the contact region between a sanding tool and a workpiece is reduced when the sanding pad is not parallel to the surface of the workpiece in the case of a flat surface or tangent to the surface of the workpiece in the case of a curved surface. The area of the contact region can also be reduced due to the curvature of the surface, which can vary. When the area of the contact region is reduced, the contact pressure will increase if the contact force is held constant. In this case, the same force is applied over a smaller area so the contact pressure is increased over the contact region.

Additionally, the abrasive media used in a material removal process wears over time. As the abrasive media wears, there is less friction and thus more force is required to perform the same material removal. Therefore, greater contact force may be needed as the abrasive media wears.

A skilled worker performing a material removal process manually can compensate for dynamic factors that affect the sanding process. Currently, there is no way to provide similar control for single-axis, force-controlled tooling to compensate for dynamic variables in the material removal process.

SUMMARY

The present disclosure provides techniques for controlling the contact force in a single-axis, force-controlled tool responsive to dynamic process variables such as tool orientation relative to the workpiece, curvature of the workpiece, wear of the abrasive media and other dynamic process variables that are not otherwise controlled by a single-axis, force-controlled actuator. A control system includes sensors for determining a contact force between the tool and the workpiece along a single-axis of compliance, and one or more additional process parameters, such as an overturning moment on the tool due to the orientation of the workpiece and surface curvature, torque about an axis of rotation of the tool, motor current, etc. The control circuit uses the measurement of these additional parameters to control the contact force between the tool and the workpiece.

DETAILED DESCRIPTION

Figure 1:
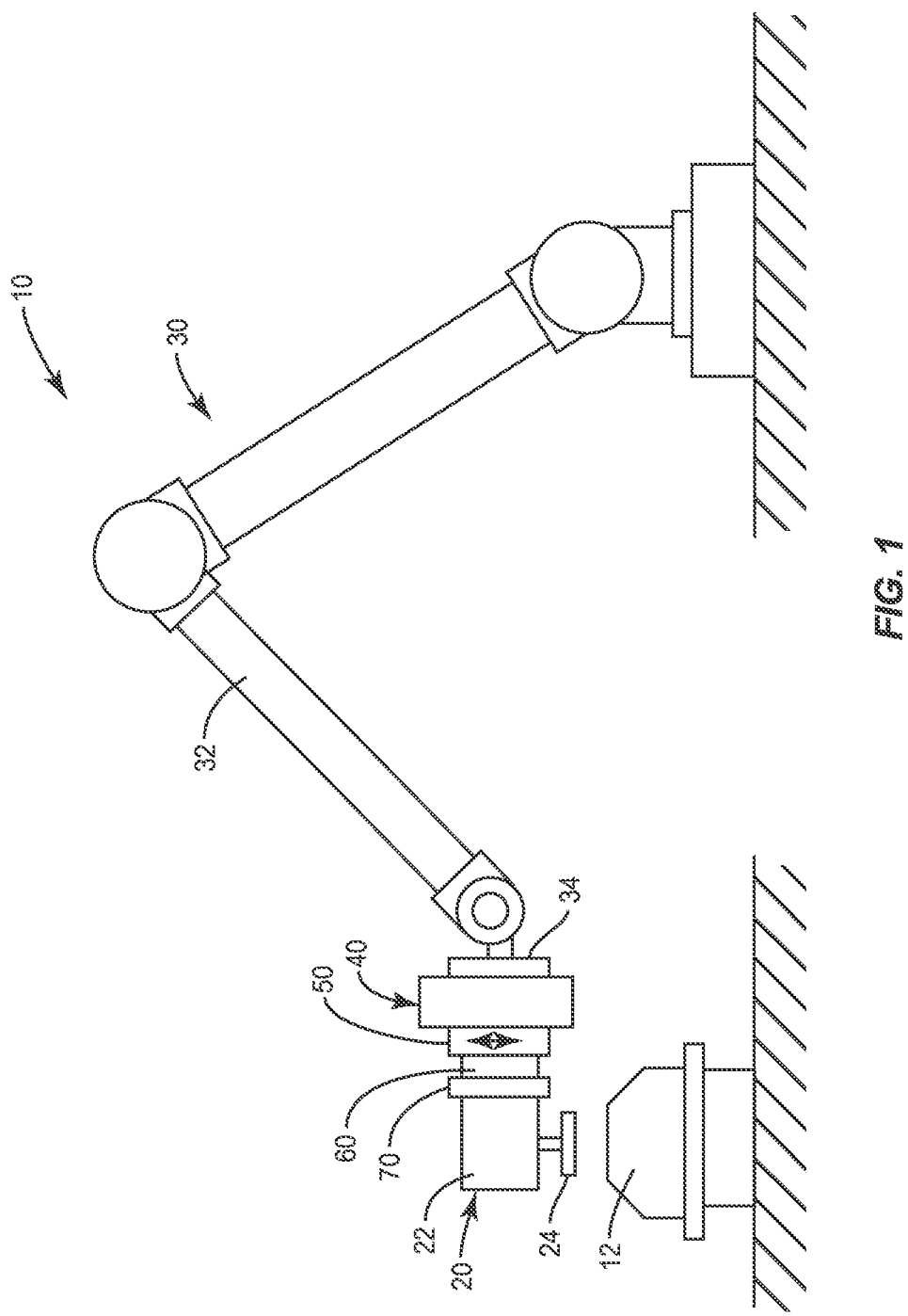
FIG. 1 illustrates a machine tool mounted to a robotic arm for performing a contact task.

Referring now to the drawings, the force control principles according to the present disclosure will be described in the context of a material removal apparatus 10. Those skilled in the art will appreciate that the techniques herein described are not limited in use to material removal processes but are more generally applicable to any force-controlled contact task with a single axis of compliance.

The material removal apparatus 10 generally comprises a tool 20 (e.g., sander) supported by a manipulator 30 for sanding a workpiece 12. The tool 20 comprises an electric or pneumatic motor 22 and a sanding pad 24. The tool 20 may comprise a rotary sander or orbital sander. The manipulator 30 comprises a robotic arm 32 that provides 6 degrees of freedom (DOF). The function of the manipulator 30 is to position the tool 20 in an operating position while sanding the workpiece 12. An actuator 40, mounted between the end effector plate 34 of the robotic arm 32 and tool 20, controls the contact force between the tool 20 and the workpiece 12 along a single axis of compliance. A control system 100 (FIG. 5) controls the amount of the contact force as hereinafter described.

Figure 2A:
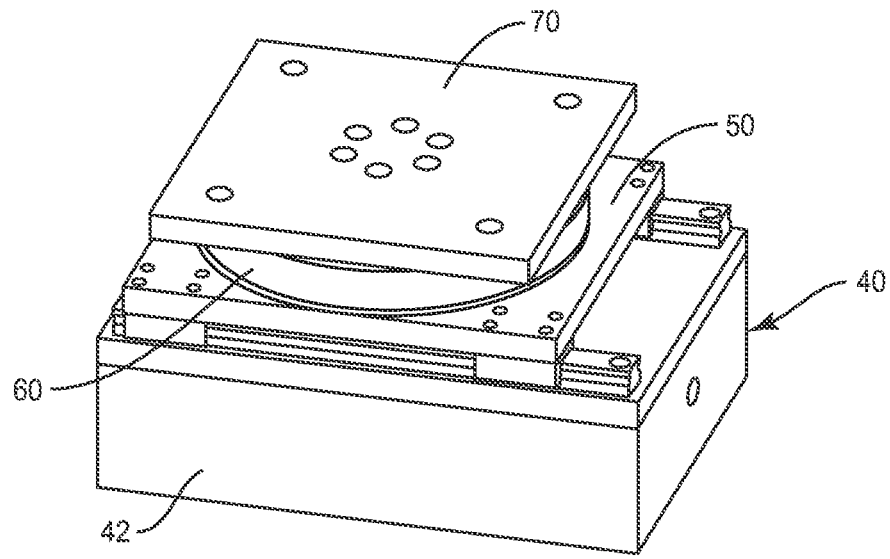
FIGS. 2A and 2B illustrate an actuator disposed between the machine tool and manipulator for controlling the contact force between the machine tool and workpiece.
Figure 2B:
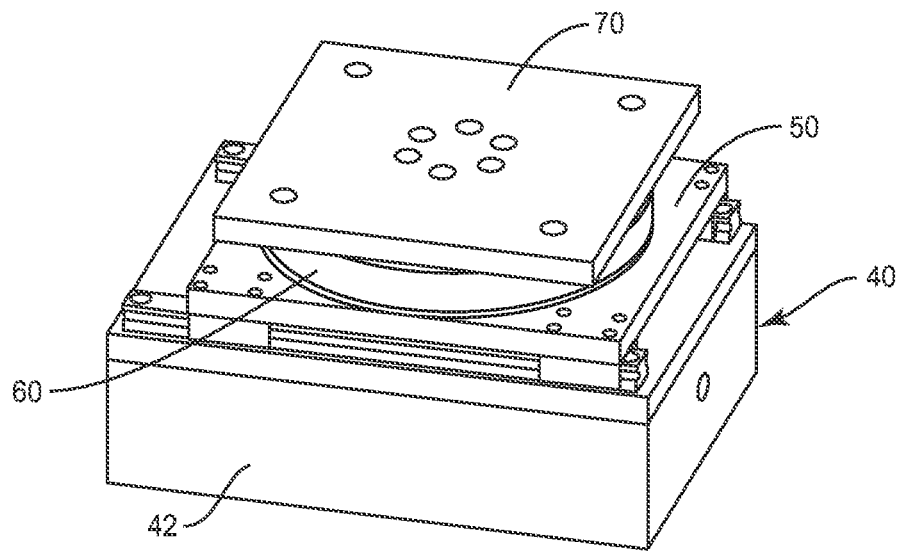
Figure 3:
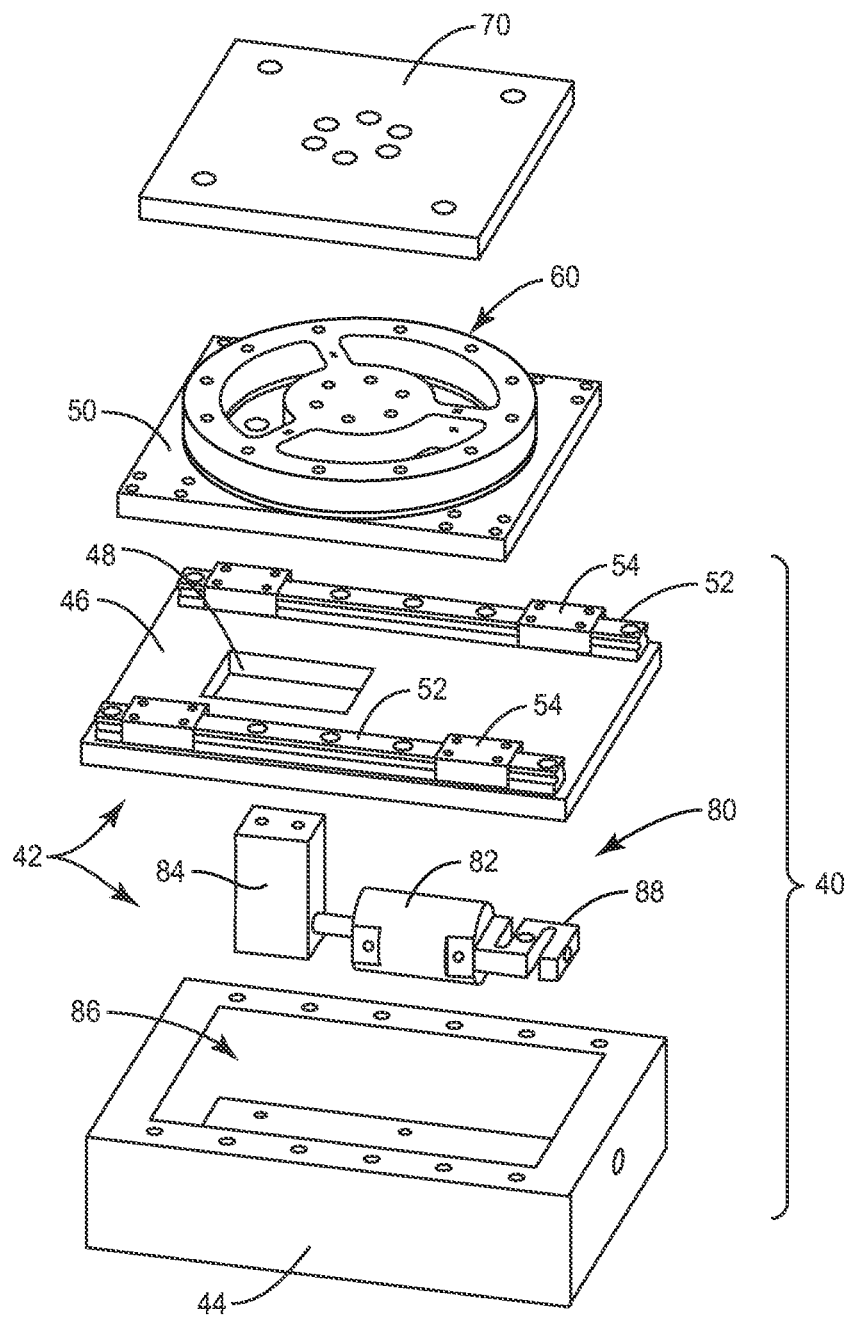
FIG. 3 is an exploded perspective view of the actuator.

FIGS. 2A, 2B and 3 illustrate an exemplary embodiment of the actuator 40. The actuator 40 comprises a housing 42 that contains an actuator assembly 80 providing the motive force for moving the tool 20 along the single axis of compliance. The housing 42 comprises a base 44 and a top plate 46. The base 44 includes a cavity 86 containing the actuator assembly 80. The top plate 46 is securely fastened by bolts (not shown) to the base 44 and includes an opening 48.

The mounting adapter plate (MAP) 50 is slidably mounted to the top plate 46 of the housing 44. A pair of linear guiderails 52 are fastened to the top surface of the top plate 46. The MAP 50 mounts to carriages 54 that slide along the linear guiderails 52.

Figure 4:
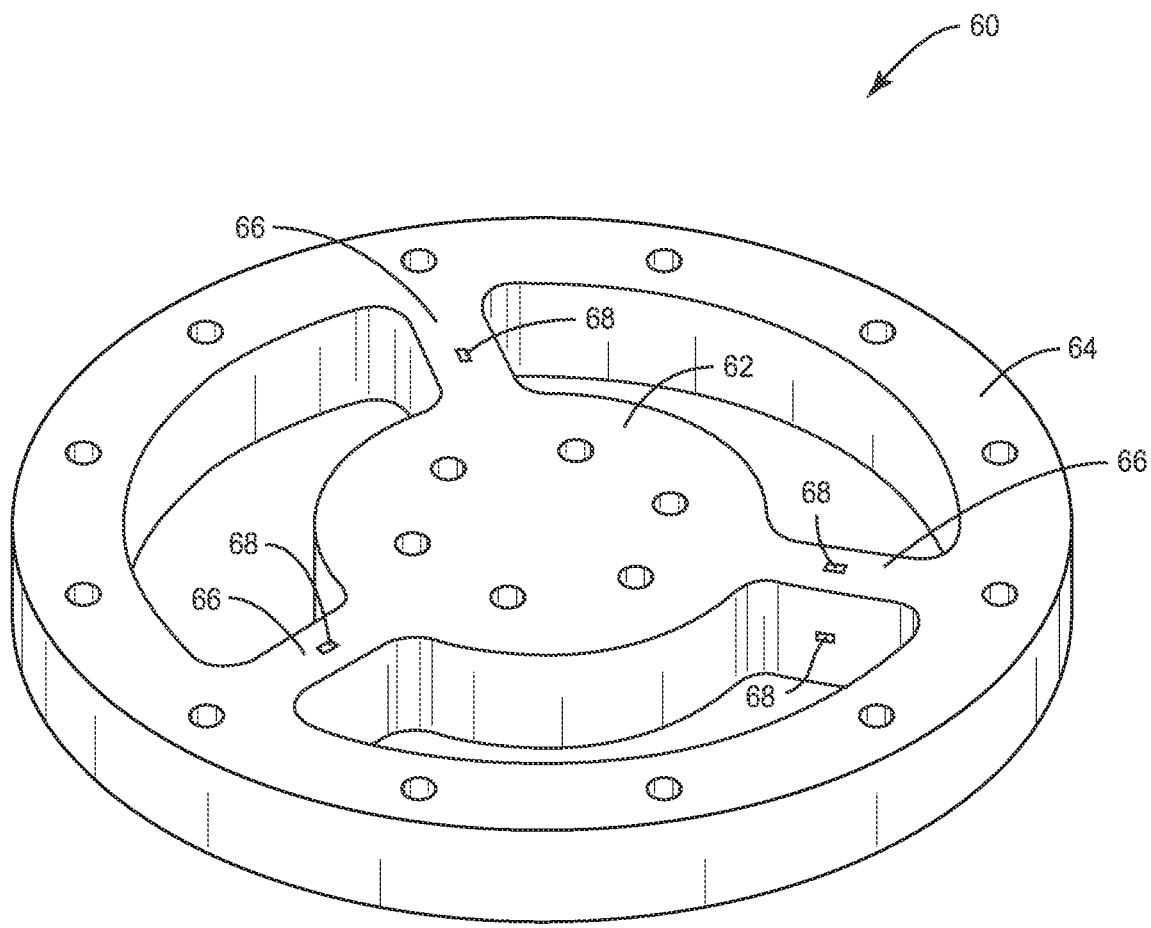
FIG. 4 illustrates a force/torque sensor disposed between the tool and the actuator.

A 6-axis force/torque sensor 60, shown in FIG. 4, is disposed between the MAP 50 and a tool adapter plate (TAP) 70. The force/torque sensor 60 comprises a central hub 62 connected to an outer ring 64 by three short beams 66. The central hub 62 is securely fastened by bolts (not shown) to the TAP 70 while the outer ring 64 is securely fastened by bolts (not shown) to the MAP 50. The sensor 60 includes six strain gauges 68; three mounted to the top surface of respective beams 66 and three mounted to one of the vertical surfaces of respective beams 66. Four of the six strain gauges 68 are visible in FIG. 4. The strain gauges 68 measure deformation of the beams 66 when forces are transmitted between the TAP 70 and MAP 50.

The TAP 70 provides a platform for mounting the tool 20 to the manipulator 30. In the illustrated embodiment, the TAP 70 comprises a generally flat plate that is securely fastened by bolts (not shown) to the hub 62 of the force/torque sensor 60. The machine tool 20 mounts to the TAP 70 of the force/torque sensor 60. The MAP 50, sensor 60 and TAP 70 collectively provide an interface between the manipulator 30 and the tool 20 with an integrated sensor 60.

In the example shown in FIG. 1, the actuator 40 is mounted to the end effector plate 34 and oriented to move the tool 20 linearly along the axis of compliance (e.g., vertical axis). The actuator assembly 80 is disposed within the housing 42 and moves the tool 20 linearly along the axis of compliance (e.g., the vertical axis) to control the amount of force applied by the tool 20 to the workpiece 12. The actuator assembly 80 comprises a pneumatic cylinder 82, a connecting block 84, and a load cell 88. The pneumatic cylinder 82 is secured through the load cell 88 to the inner wall of the base 44. The connecting block 84 mounts to the shaft of the pneumatic cylinder 82. The connecting block 84 passes through the opening 48 in the top plate 46 of the housing 42 and connects to the MAP 50. Actuation of the pneumatic cylinder 82 moves the MAP 50 back and forth along the linear guide rails. Thus, movement of the tool 20 is constrained to be along the single axis of compliance. The opening 48 is sized to provide clearance for the movement of the connecting block 84.

In the illustrated embodiment shown, the actuator 40 is supported by the robotic arm 32 and the force sensor 60 is disposed between the actuator 40 and tool 20. Those skilled in the art will appreciate that alternate force sensing arrangements are also possible. For example, the force sensor 60 could be located between the actuator 40 and the end effector plate 34 on the robotic arm 32. In another example, the force sensor 60 could be disposed between the actuator 40 and the workpiece 12. Therefore, the description of the force sensing arrangement herein is intended to be merely illustrative to aid the understanding of the disclosure and is not intended to be limiting.

Figure 5:
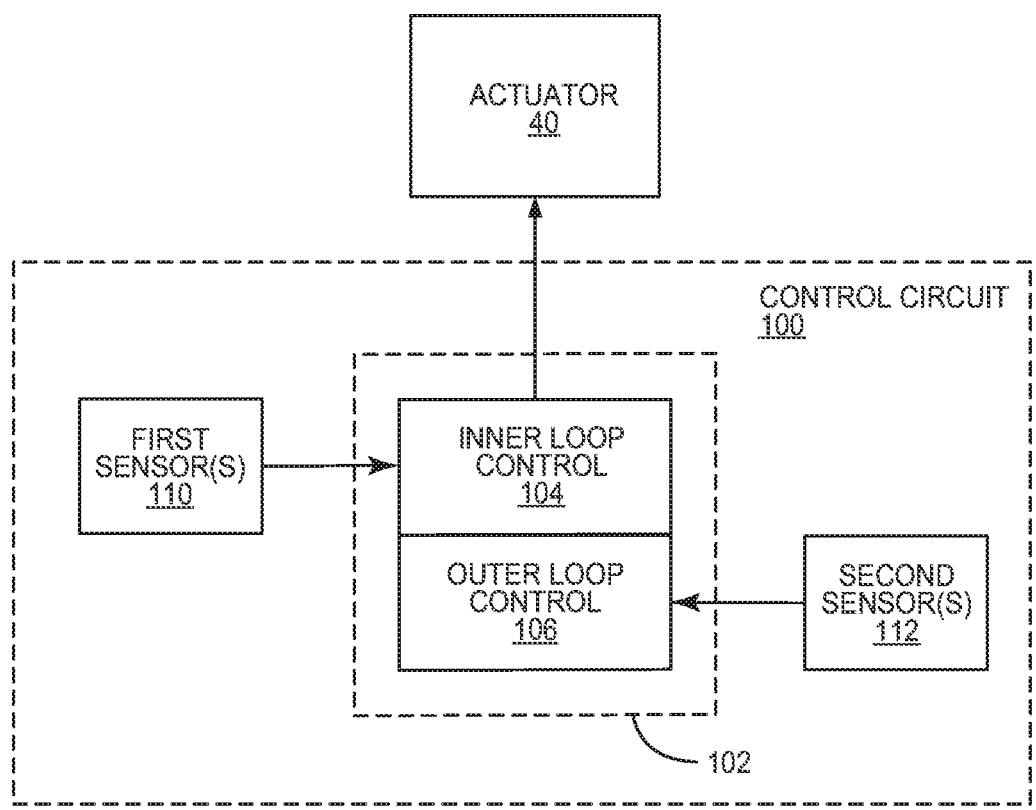
FIG. 5 illustrates a control circuit for controlling the actuator.

A control circuit 100 controls the pneumatic cylinder 82 to maintain a constant force along the single axis of compliance between the tool 20 and workpiece 12 during operations. A generic embodiment of the control circuit 100 is shown in FIG. 5. The control circuit 100 includes a processing circuit 102 including an inner loop control process 104 and an outer loop control process 106. A first sensor or set of sensors 110 provide feedback to the processing circuit 102 for determining the measured contact force Fc between the tool 20 and the workpiece 12 along the single axis of compliance. The inner loop control process 104 controls the actuator 40 to maintain the measured contact force Fc equal to a set point S. A second sensor or set of sensors 112 provide additional feedback that is used by the outer loop control process 106 to determine the set point S used by the inner loop control process 104. As will be hereinafter described, the outer loop control process 106 adjusts the set point S used by the inner loop control process 104 responsive to one or more dynamic process variables.

In the embodiment of the actuator 40 shown in FIGS. 2A, 2B and 3, the contact force Fc along the single axis of compliance is measured by the load cell 88 and fed back to the inner loop control process 104. In some embodiments, the load cell 88 could be replaced by a pressure sensor for measuring the contact force along the axis of compliance. Other variables or parameters (e.g. overturning moment) are measured by the force/torque sensor 60 and fed back to the outer loop control process 106. In some embodiments, the contact force Fc can be determined from measurements provided by the force/torque sensor 60. Also, some embodiments may feedback motor current and/or motor torque to the outer loop control process 106. In still other embodiments, the force/torque sensor 60 can measure the torque about the axis of rotation of the tool 20. The outer loop control process 106 uses the measurements related to these dynamic process variables to adjust the set point S for the inner loop control process 104.

Figure 6:
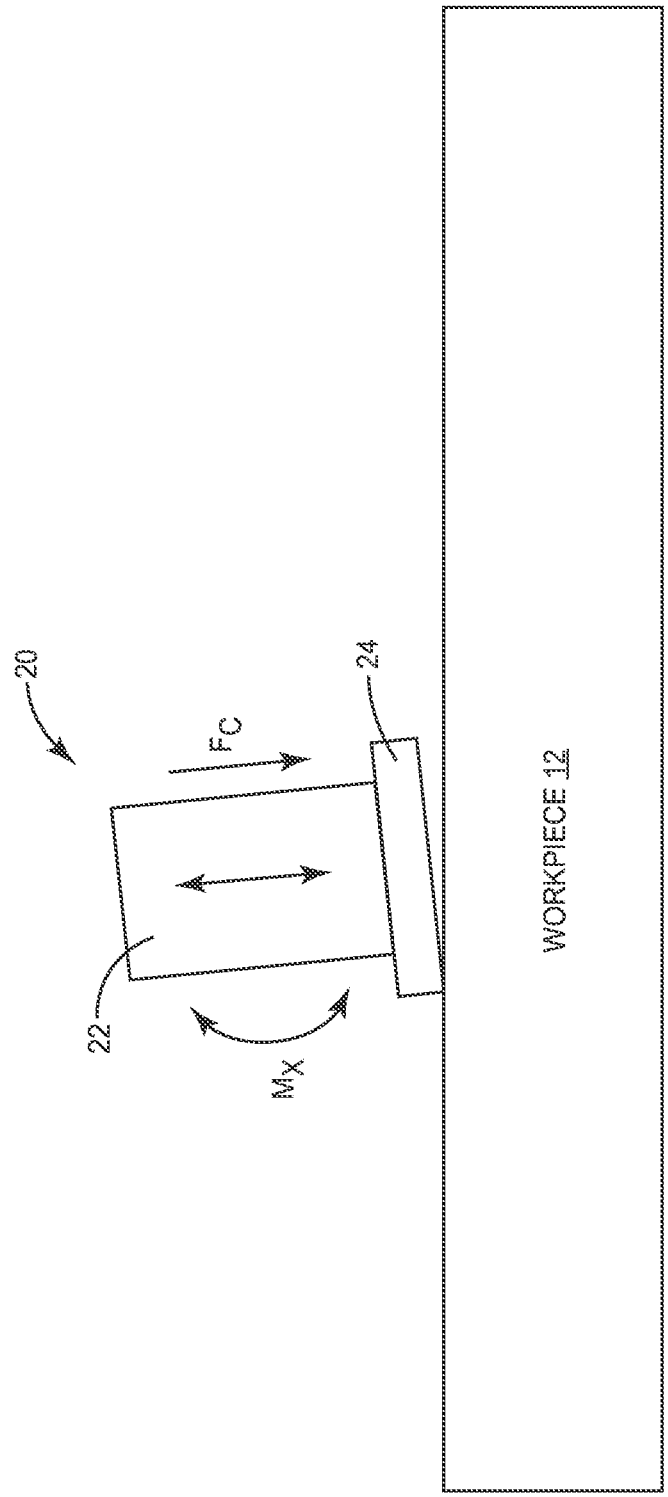
FIG. 6 illustrates a scenario where a sanding tool is contacting a flat surface workpiece at an angle.

FIG. 6 illustrates one exemplary application of the control methods to compensate for the orientation of the tool 20 relative to the workpiece 12. As shown in FIG. 6, the sanding pad 24 of the tool 20 is contacting the surface of the workpiece 12 at a slight angle. The contact force Fc will cause some deflection of the sanding pad 24 so the area of the contact region between the sanding pad 24 and the workpiece 12 will vary depending upon the angle of contact, i.e., the area of the contact region decreases as the contact angle becomes greater. Because the actuator 40 is designed to control the contact force Fc along a single axis of compliance and not the orientation of the tool 20 relative to the workpiece 12, the pressure over the contact region will increase inversely in proportion to the area of the contact region. The contact pressure is believed to be an important factor in the quality of the finished surface. In the worst case scenario, the excessive contact pressure could gouge the surface of the finished product.

According to an embodiment, data from the 6-axis force/torque sensor 60 is used to determine an overturning moment Mx of the tool 20 and dynamically adjust the contact force Fc. The measurements produced by the force/torque sensor 60 are in addition to the measurement of the contact force Fc along the single axis of compliance. These additional measurements can be used in conjunction with the measurement of the contact force Fc to improve the process outcome. For example, the additional measurements provided by the force/torque sensor 60 can be used to determine the overturning moment Mx on the tool 20, which is related to the tool orientation. The contact force Fc applied to the workpiece 12 can be changed depending on an overturning moment Mx. In one embodiment, the contact force Fc is controlled to maintain a pre-determined set point S until the overturning moment Mx meets or exceeds a threshold. When the overturning moment Mx satisfies the threshold, the set point S used by the inner loop control process 104 is adjusted to prevent the overturning moment Mx from exceeding the threshold.

Figure 7:
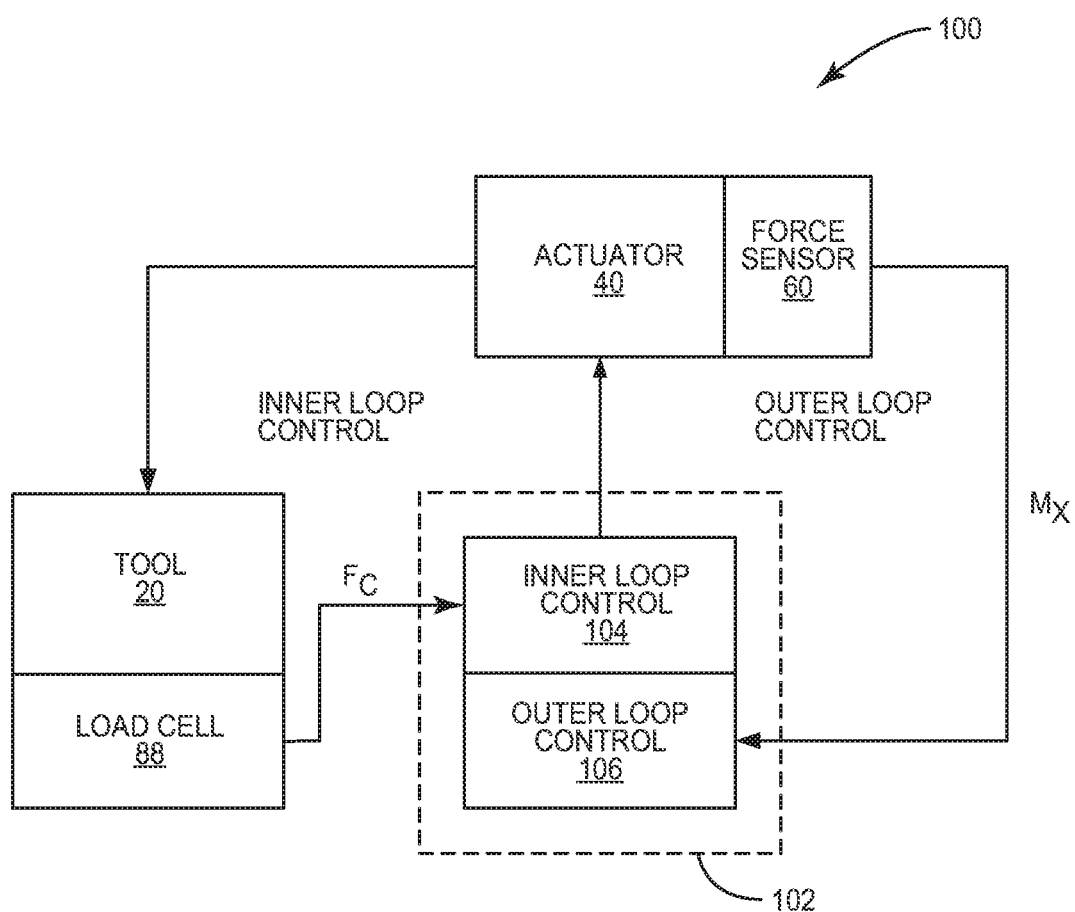
FIG. 7 illustrates a control circuit wherein the contact force is adjusted responsive to an overturning moment due to tool orientation to compensate for reduced area of contact between the tool and the workpiece.

FIG. 7 illustrates one implementation of the controller 100 to compensate for tilting of the tool 20 relative to the workpiece 12. In this embodiment, the load cell 88 measures the contact force Fc between the tool 20 and the workpiece 12 and feeds the contact force Fc back to the inner loop control process 104. The force/torque sensor 60 measures the overturning moment Mx and feeds the overturning moment Mx back to the outer loop control process 106. The inner loop control process 104 maintains the Fc equal to a predetermined set point S until the overturning moment Mx reaches a threshold. Once the threshold is reached, the outer loop control process 106 varies the set point S to prevent the overturning moment Mx from exceeding the threshold.

Figure 8B:
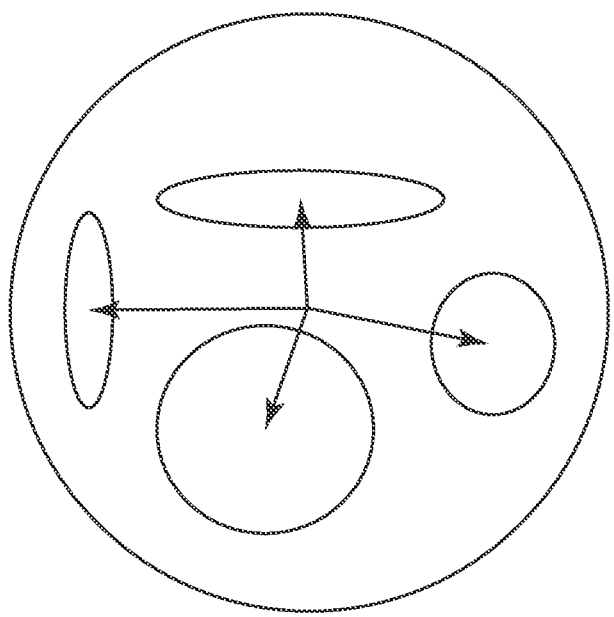
FIGS. 8A and 8B illustrate a scenario where a sanding tool is contacting a curved surface workpiece at an angle.
Figure 8A:
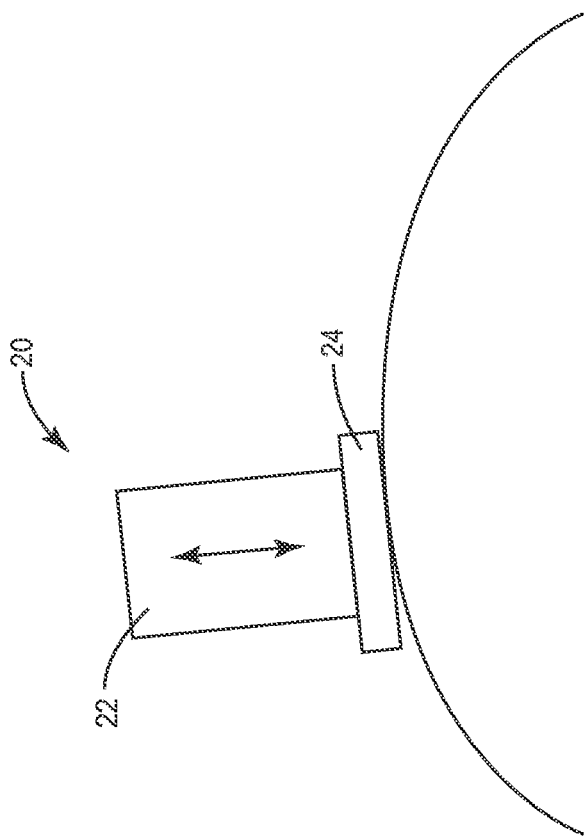

FIGS. 8A and 8B illustrate another example of the force control method used to compensate for curvature of the surface of the workpiece 12. FIG. 8A shows the tool 20 contacting a curved surface of a workpiece 12. FIG. 8B shows that the area of the contact region may vary depending on the curvature of the workpiece 12 and the orientation of the tool 20 relative to the workpiece 12. In general, increasing curvature correlates with reduced contact area. Improper orientation of the tool 20 relative to the workpiece 12 causes displacement of the contact region relative to the axis of sanding. In this case, it is also useful to reduce the contact force Fc as the area of the contact region is reduced. Using measurements from the force/torque sensor 60, the area of the contact region can be estimated. The ratio of the contact force Fc and torque T about the sanding axis is a function of the area of the contact region and the position of the contact region measured from the axis of compliance to the centroid of each contact region. The relative position of the contact region can be approximated by the two overturning moments Mx and My. By removing the contribution of the position of the contact region from the fore/torque ratio (Fc/T), the area of the contact region can be approximated. The computed area of the contact region can be used by the outer loop control process 106 to control the set point S for the inner loop control process 104 to maintain a constant pressure in the contact region.

Figure 9:
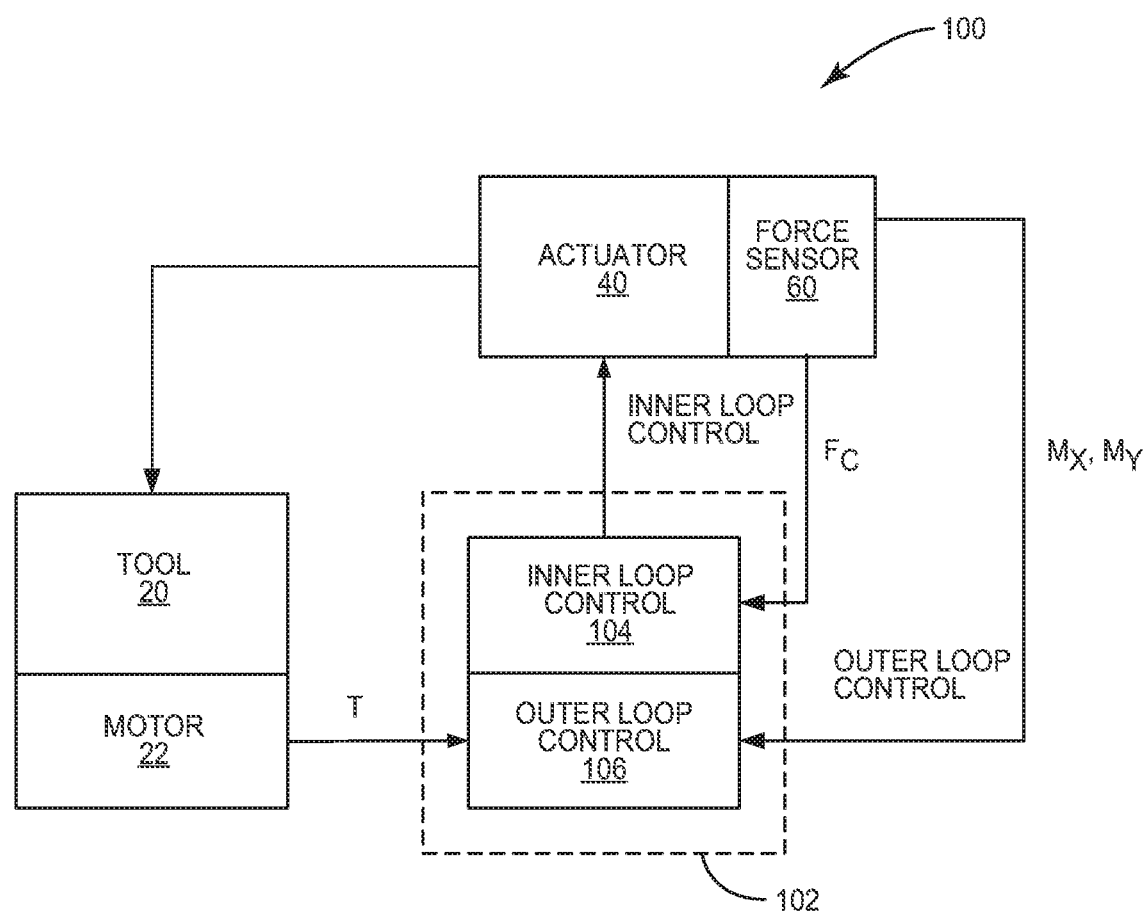
FIG. 9 illustrates a control circuit wherein the contact force is adjusted responsive to an overturning moment due to tool orientation and surface curvature to compensate for reduced area of contact between the tool and the workpiece.

FIG. 9 illustrates an implementation of the controller 100 to compensate for curvature of the workpiece 12 and orientation of the tool 20 relative to the workpiece 12. In this embodiment, the force/torque sensor 60 measures the contact force Fc between the tool 20 and the workpiece 12 and feeds the contact force Fc back to the inner loop control process 104. Alternatively, the contact force could be measured by the load cell 88. The force/torque sensor 60 measures the overturning moments Mx and My and feeds the overturning moments Mx and My back to the outer loop control process 106. Torque T about the rotational axis of the tool 20 is also fed back by the motor 22 to the outer loop control process 106. Alternatively, the torque T can be measured by the force sensor 60. The inner loop control process 104 maintains the Fc equal to a predetermined set point S. The outer loop control process 106 adjusts the set point S based on the overturning moments Mx and My and the motor torque T to compensate for curvature of the workpiece 12 and tilting of the tool 20 relative to the workpiece.

In another example, the force control method can be used to compensate for wear of the abrasive media. Generally, the abrasive media used in sanding applications wears over time so that more force is required to achieve the same material removal as the abrasive media wears. This variation in the amount of material removal can affect the quality of the finished product. A skilled workman performing this task manually has the ability to visually and tactilely assess the workpiece 12 and adjust the force or duration of the material removal to compensate for wear of the abrasive media. As with orientation of the tool and workpiece curvature, conventional single-axis force control methods do not compensate for wear of the abrasive media.

According to an embodiment of the present disclosure, the torque T about the sander axis, or the oscillating lateral forces in the case of an orbital sander, are measured and provided to the outer loop control process 106. As the abrasive medium wears, there is less friction between the sanding pad 24 and workpiece 12, which will cause the motor torque T to decrease. The amount of material removal is a function of the motor torque T and the contact force Fc. The ratio of the motor torque T to the contact force Fc can be used as a proxy for wear of the abrasive medium. The amount of contact force Fc can be adjusted depending on the ratio of the abrasive torque to the contact force to compensate for the wear.

Figure 10:
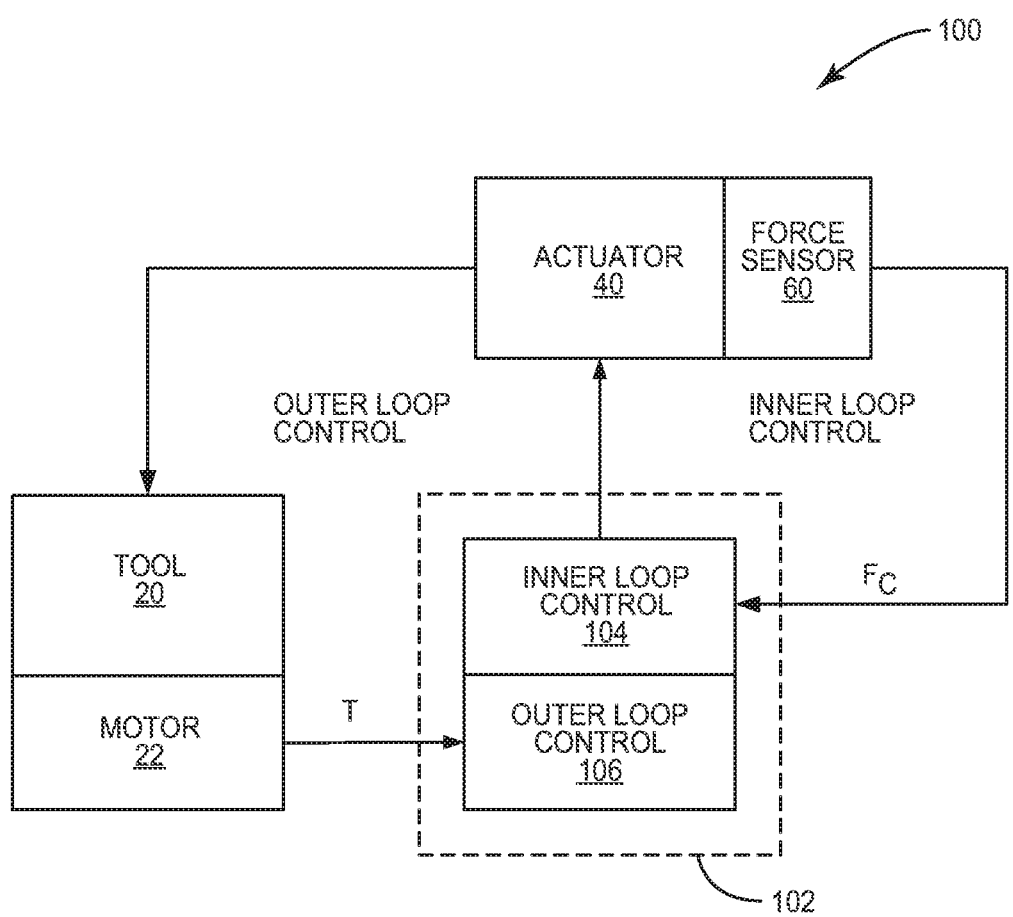
FIG. 10 illustrates a control circuit wherein the contact force is adjusted responsive to torque about a rotating axis of the tool to compensate for wear of an abrasive media.

FIG. 10 illustrates one implementation of the controller 100 to compensate for wear of the abrasive media. In this embodiment, the force/torque sensor 60 measures the contact force Fc between the tool 20 and the workpiece 12 and feeds the contact force Fc back to the inner loop control process 104. Alternatively, the contact force Fc could be measured by the load cell 88. Motor torque T is also fed back by the motor 22 to the outer loop control process 106. The inner loop control process 104 maintains the Fc equal to a predetermined set point S. The outer loop control process 106 adjusts the set point S based on the motor torque T to compensate for wear of the abrasive media. In a variation, measurement data from the force sensor 60 can be used to determine a torque about the axis of rotation of the tool 20 to be used in place or, or in addition to, the motor torque T.

Figure 11:
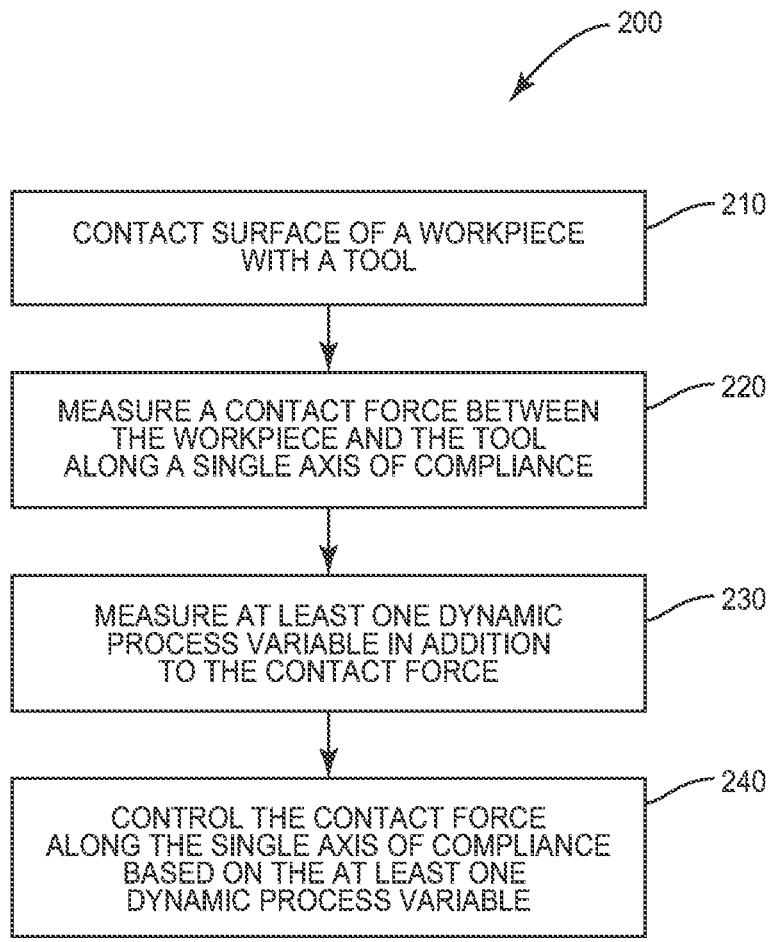
FIG. 11 illustrates an exemplary method for controlling the contact force between a tool and a workpiece along a single axis of compliance.

FIG. 11 illustrates an exemplary method 200 for controlling a contact task, such as sanding, performed by an automated tool. The method 200 comprises contacting a surface of a workpiece 12 with a tool 20 (210), measuring a contact force between the workpiece 12 and the tool 20 along a single axis of compliance (220), measuring at least one dynamic process variable in addition to the contact force (230), and controlling the contact force along the single axis of compliance based on the at least one dynamic process variable (240).

In some embodiments of the method 200, measuring a contact force between the workpiece and the tool comprises measuring the contact force with a load cell on the tool.

In some embodiments of the method 200, measuring a contact force between the workpiece and the tool comprises measuring the contact force with a force sensor disposed between the workpiece 12 or tool 20 and an actuator 40 controlling the relative position of the tool 20 and workpiece 12 along the single axis of compliance.

In some embodiments of the method 200, the dynamic process variable comprises a linear force or torque between the workpiece or tool and an actuator controlling the relative position of the tool and workpiece along the single axis of compliance.

In some embodiments of the method 200, measuring the dynamic process variable comprises measuring the linear force or torque with a force sensor disposed between the workpiece 12 or tool 20 and the actuator 40.

In some embodiments of the method 200, the force sensor comprises a 6-axis force/torque sensor 60 between the tool and the actuator.

In some embodiments of the method 200, the parameter comprises a motor current or motor torque for the tool.

In some embodiments of the method 200, controlling the contact force along the single axis of compliance comprises controlling a relative position of the workpiece 12 and tool 20.

In some embodiments of the method 200, controlling a relative position of the workpiece 12 and tool 20 along the single axis of compliance comprises linearly displacing the tool 20 along the single axis of compliance.

In some embodiments of the method 200, controlling a relative position of the workpiece 12 along the single axis of compliance and tool 20 based on the parameter comprises linearly displacing the workpiece 12 along the single axis of compliance.

The techniques herein described allow the contact force in a single-axis, force-controlled tool to be controlled responsive to dynamic process variables such as tool orientation relative to the workpiece, curvature of the workpiece, wear of the abrasive media, and other dynamic process variables that are not otherwise controlled by a single-axis, force-controlled actuator. The control methods will improve the quality of the finished surface in machined parts and reduce the number of defects in the machined parts. Reduction in the material defects will, in turn, increase quality of the finished part and result in lower costs because fewer parts will be discarded.

What is claimed is:

1. A method, performed by a control system, of controlling a contact task in a material removal operation on a workpiece, the method comprising:
    measuring a contact force between a material removal tool and a workpiece as the tool is moved along a single axis of compliance;
    measuring at least one dynamic process variable in addition to the contact force;
    determining a force set point based on the dynamic process variable; and
    controlling an actuator controlling the relative position of the material removal tool and workpiece along the single axis of compliance, based on the measured contact force and the force set point, to maintain the contact force at the force set point so as to prevent a degradation in a quality of a finished surface of the workpiece due to excessive contact pressure.

2. The method of claim 1 wherein measuring a contact force between the workpiece and the material removal tool comprises measuring the contact force with a load cell on the material removal tool.

3. The method of claim 1 wherein measuring a contact force between the workpiece and the material removal tool comprises measuring the contact force with a force sensor disposed between the workpiece or material removal tool and an actuator controlling the relative position of the material removal tool and workpiece along the single axis of compliance.

4. The method of claim 1 wherein measuring a contact force between the workpiece and the material removal tool comprises measuring the contact force with a force sensor disposed between the actuator controlling the relative position of the material removal tool and workpiece along the single axis of compliance and an end effector plate of a robotic arm.

5. The method of claim 1 wherein the dynamic process variable comprises a linear force or torque between the material removal tool and an actuator controlling the relative position of the material removal tool and workpiece along the single axis of compliance.

6. The method of claim 5 wherein measuring the dynamic process variable comprises measuring the linear force or torque with a force sensor disposed between the material removal tool and the actuator.

7. The method of claim 6 wherein the force sensor comprises a 6-axis force sensor between the material removal tool and the actuator.

8. The method of claim 1 wherein the dynamic process variable comprises a motor current or motor torque for the material removal tool.

9. The method of claim 1 wherein determining the set point based on the dynamic process variable comprises determining the set point based on an overturning moment of the material removal tool.

10. The method of claim 9 wherein determining the set point based on the dynamic process variable comprises determining the set point further based on a torque about the axis of rotation of the material removal tool.

11. The method of claim 1 wherein determining a set point based on the dynamic process variable comprises determining the set point based on motor current or motor torque.

12. An automated material removal tool comprising:
    a material removal tool for machining a workpiece;
    an actuator for moving the material removal tool relative to the workpiece along a single axis of compliance;
    a first sensor for determining a contact force between the material removal tool and the workpiece along the single axis of compliance;
    a second sensor for determining a dynamic process variable in addition to the contact force along the single axis of compliance;
    a processing circuit for controlling the actuator, the processing circuit being configured to determine a force set point based on the dynamic process variable; and
    control the actuator based on the measured contact force and the force set point to maintain the contact force at the force set point so as to prevent a degradation in a quality of a finished surface of the workpiece due to excessive contact pressure.

13. The automated tool of claim 12 wherein the first sensor comprises a load cell on the material removal tool.

14. The automated tool of claim 12 wherein the first sensor comprises a force sensor disposed between the workpiece or material removal tool and the actuator along the single axis of compliance.

15. The method of claim 12 wherein measuring a contact force between the workpiece and the material removal tool comprises measuring the contact force with a force sensor disposed between the actuator and an end effector plate of a robotic arm.

16. The automated tool of claim 12 wherein the second sensor is configured to measure a linear force or torque between the material removal tool and the actuator controlling the relative position of the material removal tool and workpiece along the single axis of compliance.

17. The automated tool of claim 16 wherein the second sensor comprises a force sensor disposed between the material removal tool and the actuator.

18. The automated tool of claim 17 wherein the force sensor comprises a 6-axis force sensor between the material removal tool and the actuator.

19. The automated material removal tool of claim 12 wherein the dynamic process variable comprises a motor current or motor torque for the material removal tool.

20. The automated material removal tool of claim 12 wherein the processing circuit determines the set point based on an overturning moment of the material removal tool.

21. The automated material removal tool of claim 20 wherein the processing circuit determines the set point further based on a torque about the axis of rotation of the material removal tool.

22. The automated material removal tool of claim 12 wherein the processing circuit determines the set point based on motor current or motor torque.

23. A control circuit for an automated material removal tool configured to perform a material removal task by contact with a workpiece, the control circuit comprising:
- a first sensor for determining a contact force between the material removal tool and the workpiece as the material removal tool is moved along a single axis of compliance;
- a second sensor for determining a dynamic process variable in addition to the contact force along the single axis of compliance;
- a processing circuit for controlling an actuator, the processing circuit being configured to determine a force set point based on the dynamic process variable; and
  control the actuator based on the measured contact force and the force set point to maintain the contact force at the force set point so as to prevent a degradation in a quality of a finished surface of the workpiece due to excessive contact pressure.

24. The control circuit of claim 23 wherein the first sensor comprises a load cell on the material removal tool.

25. The control circuit of claim 23 wherein the first sensor comprises a force sensor disposed between the material removal tool and the actuator controlling the relative position of the material removal tool and workpiece along the single axis of compliance.

26. The method of claim 23 wherein measuring a contact force between the workpiece and the material removal tool comprises measuring the contact force with a force sensor disposed between the actuator controlling the relative position of the material removal tool and workpiece along the single axis of compliance and an end effector plate of a robotic arm.

27. The control circuit of claim 23 wherein the second sensor is configured to measure a linear force or torque between the workpiece or material removal tool and an actuator controlling the relative position of the material removal tool and workpiece along the single axis of compliance.

28. The control circuit of claim 27 wherein the second sensor comprises a force sensor disposed between the workpiece or material removal tool and the actuator.

29. The control circuit of claim 28 wherein the force sensor comprises a 6-axis force sensor between the material removal tool and the actuator.

30. The control circuit of claim 23 wherein the dynamic process variable comprises a motor current or motor torque for the material removal tool.

31. The control circuit of claim 23 wherein the processing circuit determines the set point based on an overturning moment of the material removal tool.

32. The control circuit of claim 31 wherein the processing circuit determines the set point further based on a torque about the axis of rotation of the material removal tool.

33. The control circuit of claim 23 wherein the processing circuit determines the set point based on motor current or motor torque.

34. A controller for an automated material removal tool configured to perform a material removal task by contact with a workpiece, the controller comprising a processing circuit configured to:
- determine a contact force between the material removal tool and the workpiece based on first sensor data;
- determine a dynamic process variable based on second sensor data;
- determine a force control set point based on the dynamic process variable; and
- control the contact force according to the force control set point so as to prevent a degradation in a quality of a finished surface of the workpiece due to excessive contact pressure.

35. The controller of claim 34 wherein the processing circuit determines the set point based on an overturning moment of the material removal tool.

36. The controller of claim 34 wherein the processing circuit determines the set point further based on a torque about the axis of rotation of the material removal tool.

37. The controller of claim 34 wherein the processing circuit determines the set point based on motor current or motor torque.

* * * * *